United States Patent [19]

Hoshikawa et al.

[11] Patent Number: 4,503,304
[45] Date of Patent: Mar. 5, 1985

[54] INDUCTIVE HEATING DEVICE HAVING A PLURALITY OF HEATING COIL UNITS

[75] Inventors: Toru Hoshikawa, Kagawa; Yoshihiko Osaki, Hyogo, both of Japan

[73] Assignees: Mitsubishi Denki Kabushiki Kaisha, Tokyo; Toyo Tanso Co., Ltd., Osaka, both of Japan

[21] Appl. No.: 365,849

[22] Filed: Apr. 5, 1982

[30] Foreign Application Priority Data

Apr. 7, 1981 [JP] Japan .................................. 56-53365
Apr. 7, 1981 [JP] Japan .................................. 56-53366

[51] Int. Cl.³ ............................................. H05B 6/44
[52] U.S. Cl. .......................... 219/10.49 R; 219/10.71; 219/10.79; 219/10.43; 219/10.75; 373/144; 373/152; 373/155; 373/157
[58] Field of Search ................ 219/10.49 R, 10.71, 219/10.77, 10.67, 10.75, 10.43, 10.79; 373/151, 155, 157, 152, 144

[56] References Cited

U.S. PATENT DOCUMENTS

| | | | |
|---|---|---|---|
| 1,980,875 | 11/1934 | Northrup | 219/10.77 X |
| 2,452,197 | 10/1948 | Kennedy | 219/10.79 X |
| 3,314,670 | 4/1967 | Kennedy | 373/155 X |
| 3,689,726 | 9/1972 | Howell | 219/10.71 |
| 4,258,241 | 3/1981 | Soworowski | 219/10.79 X |

FOREIGN PATENT DOCUMENTS

| | | | |
|---|---|---|---|
| B33704 | 8/1956 | Fed. Rep. of Germany | 373/151 |
| 694983 | 6/1979 | U.S.S.R. | 219/10.71 |

Primary Examiner—P. H. Leung
Attorney, Agent, or Firm—Sughrue, Mion, Zinn, Macpeak & Seas

[57] ABSTRACT

An inductive heating device for uniformly heating a workpiece at rest has a plurality of heating coil units disposed so as to surround the workpiece. The heating coil units are connected in parallel to a power source, and a transformer is used to vary the voltage across the terminals of the outermost units to increase the current flowing through these outermost units. The device, therefore, has a very short insufficient heating temperature zone attributable to an end magnetic flux effect.

3 Claims, 3 Drawing Figures

INDUCTIVE HEATING DEVICE HAVING A PLURALITY OF HEATING COIL UNITS

BACKGROUND OF THE INVENTION

1. Field of the Invention

The present invention relates to an inductive heating device for heating workpieces at rest and, in particular, to a device for graphitizing carbon.

2. Description of the Prior Art

A conventional device for heating a workpiece at rest is shown in FIG. 1. In FIG. 1, electrodes 2 are placed on opposite sides of pieces of carbon 21. A power source 6 supplies electric current to the electrodes 2 and the pieces of carbon 21. The current is passed between the electrodes 2 and, therefore, the current is also passed through the pieces of carbon 21. A first insulator 3, comprising carbon powder "A", is used to fill the spaces between the pieces of carbon 21, the carbon powder "A" facilitating the application of current to the pieces of carbon 21. A second insulator 4, comprising carbon powder "B", is used to cover the top of the electrodes 2 and the pieces of carbon 21 to insulate thermally the top of the heating device. A refractory member 5 is placed below the electrodes 2, the pieces of carbon 21 and the carbon powder "A" to insulate thermally the bottom of the heating device.

In the conventional heating device, in order to supply current uniformly to the pieces of carbon 21, the first insulator 3, comprising the carbon powder "A", is used to fill the gaps between the pieces of carbon 21. In this case, the spatial distribution of the current between the electrodes 2 varies, the amount of variation depending on how well the gaps between the pieces of carbon 21 are filled with the carbon powder "A". In addition, a long period of time is required for applying current to adequately heat the pieces of carbon 21. Such a lengthy current application time results in excessive heat loss through the electrodes 2. For these reasons, the ratio of electric power applied by the power source 6 to the sum of the surface areas of the pieces of carbon 21 to be heated (hereinafter referred to as "a surface power density") is, in general, set to about 3.5 W/cm².

SUMMARY OF THE INVENTION

In view of the foregoing, an object of the present invention is to provide an inductive heating device suitable for heating a workpiece at rest. The device has a heating coil which surrounds a workpiece to be heated and a heat insulating layer interposed between the workpiece to be heated and the heating coil. As current flows into the heating coil, an eddy current is induced in the peripheral portion of the workpiece to be heated, thus heating the workpiece. The heat insulating layer reduces the dissipation of heat from the workpiece being heated and also prevents the surface of the workpiece from oxidizing.

In a preferred embodiment, the heating coil comprises a plurality of heating coil units connected to a power source in parallel. In addition, the outermost heating coil units are connected to a voltage varying means so that the current in these outermost units can be varied. Using the device so constructed, the workpiece can be heated to a temperature of 2,200° C. or higher, in a short period of time, with a high surface power density. In addition, the length of an insufficient heating temperature zone between the plurality of heating coil units, attributable to an end magnetic flux effect, is reduced.

DESCRIPTION OF THE PREFERRED EMBODIMENTS

Figure 2:
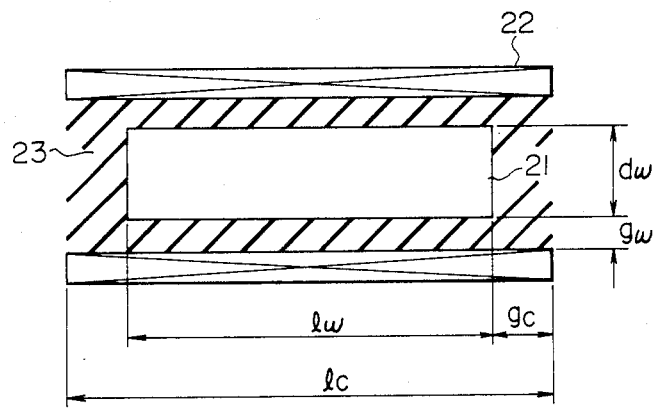
FIG. 2 is a sectional view showing one embodiment of the present invention.

A first embodiment of the device of the invention will be described with reference to FIG. 2. As shown in FIG. 2, an inductive heating coil 22 is arranged around a workpiece 21 to be heated, the workpiece being made of carbon. The space between the coil 22 and the workpiece 21 is filled with a heat insulating material 23, such as carbon powder "B". The heating coil 22 is then connected to an AC power source (not shown).

In this embodiment, the inductive heating coil 22 surrounds the workpiece 21. As current flows into the heating coil 22, an eddy current is induced in the peripheral of the workpiece to be heated. The current permeation depth of the eddy current varies, depending on the geometry involved and the amount of current flowing in the heating coil 22. The core of the workpiece 21 is heated by the conduction of heat from the peripheral portion of the workpiece.

In order to prevent the dissipation of heat from the peripheral portion of the workpiece and to prevent the peripheral portion of the workpiece 21 from oxidizing, the workpiece 21 is surrounded by the heat insulating material 23, such as carbon powder "B".

The heating device and method as described is suitable for manufacturing silicon carbonate.

In the device of FIG. 2, when the workpiece at rest is subjected to inductive heating, an end magnetic flow effect makes it difficult to heat the end portion of the workpiece 21 so that the workpiece 21 is heated uniformly as desired. In order to improve the heating of the end portions of the workpiece 21, the distance gc between the end of the heating coil 22 and the end of the workpiece 21, and the clearance gw between the heating coil 22 and the workpiece 21 are adjusted, with a particular relationship being maintained between the distance gc and the clearance gw.

Through experience, it is known that the particular relationship between the distance gc and the clearance gw is gw≑gc. Therefore, if uniform heating of the workpiece at rest is to be achieved using this device, it is esential to maintain the relationship gw≑gc, as described above. Therefore, if the clearance gw is large, then it is necessary to use a heating coil, the total length lc of which is much larger than the total length lw of the workpiece. Thus, in some instances, the heating zone of the heating device of the first embodiment is considerably long.

Figure 1:
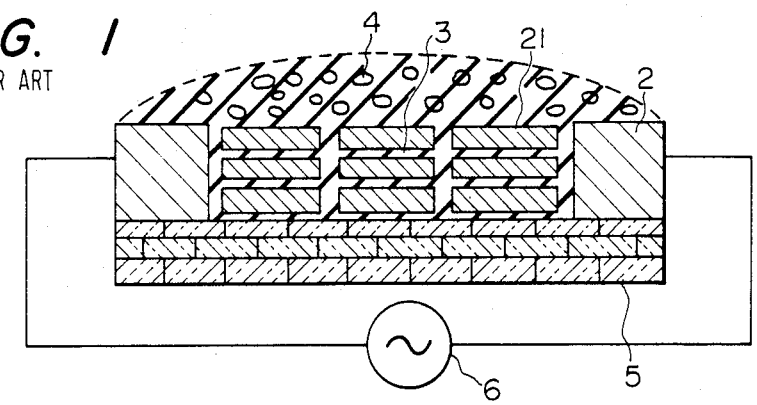
FIG. 1 is a sectional view of a conventional inductive heating device for heating a workpiece at rest.
Figure 3:
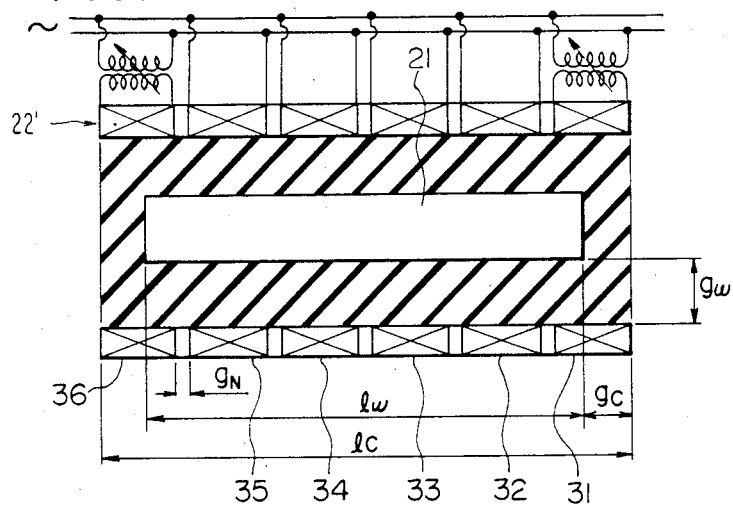
FIG. 3 is a sectional view showing a further embodiment of the present invention.

FIG. 3 shows a second embodiment of the present invention wherein the length of the heating zone can be considerably reduced. Referring to FIG. 3, a heating coil 22' is disposed so as to surround a workpiece 21 to be heated uniformly, similar to the device of FIG. 1. However, in the device of FIG. 2, the heating coil 22' is divided into a plurality of smaller heating coil units 31, 32, 33, 34, 35 and 36, which are connected in parallel to an AC power source (not shown).

The parallel-connected heating coil units 31 through 36, shown in FIG. 2, have the same voltage applied across their terminals. However, currents $I_{31}$ through $I_{36}$, flowing in heating coils 31 through 36, are determined by the impedances $Z_{31}$ through $Z_{36}$ of the various heating coils, respectively. When the reactances $X_{31}$, $X_{32}$ . . . and $X_{36}$) and the resistances ($R_{31}$, $R_{32}$, . . . $R_{36}$) of the various coil impedances are compared with each other, in general, the reactances are several times higher than the resistances in inductive heating. Therefore, the comparison of the coil impedances mentioned above can be replaced readily by a comparison of the coil reactances. The magnetic resistances $R_{31}$ and $R_{36}$ of the outermost heating coils are much higher than those of the remaining heating coils. Since $L \infty 1/R$ and $X = wL$ are held by electromagnetic theory, the reactances of the outermost heating coils are lower than those of the remaining heating coils. Thus, the currents in the heating coils 31 and 36 at both ends of the coil 22' are higher than the currents in the other heating coils 22, 23 and 24. Accordingly, the magnetic flux is increased at both the end coils 31 through 36, thereby reducing the length of the insufficient heating temperature zone between coils 31-36 caused by the end magntic flux effect, i.e. for the same clearance gw as shown in the embodiment of FIG. 2, gc can be reduced to be smaller than gw.

In order to further reduce the length of the insufficient heating zone, a voltage varying means may be connected to the two end coils 31 and 36, or a transformer may be connected thereto, so that the current flowing in these end coils 31 and 36 can be further varied by varying the voltages applied across the terminals of these end coils to further increase the magnetic fields created thereby.

The above-described embodiments of the present invention for heating a workpiece at rest are applicable to a workpiece which should be subjected to heat-treatment at a high temperature (especially 1,500° C. or higher), while oxidation of the workpiece due to a high heating temperature is prevented. More specifically, the embodiments may be employed as a silicon carbide oven, a tungsten carbide oven, or a graphitization oven; i.e., a graphitization inductive heating device.

Heretofore, when heating a workpiece at rest, the division type heating coil, in general, has not been employed because the workpiece is heated at different temperatures at the junctions between the heating coils. However, in the case where high temperatures must be used, as in the case of graphitization inductive heating, the clearance gw is set to a large value by taking the heat insulation characteristic and the refractory characteristic into consideration and, therefore, the junction gN can be maintained much smaller than the clearance gw. Thus, the effect of the junctions gN of the heating coils can be disregarded in the device of the present invention.

It should be noted that the invention is not limited only to devices used for graphitization inductive heating. The invention is applicable to inductive heating devices for heating workpieces other than carbon.

According to the present invention, by providing a plurality of heating coils connected to a power source in parallel and incorporating voltage varying means for the outermost coils, the coil end magnetic flux effect is increased and, therefore, a workpiece can be heated uniformly while keeping the overall length of the device as small as possible.

What is claimed is:

1. In combination with an inductive heating device, a stationary workpiece having a predetermined length, said inductive heating device comprising, a heating means comprised of a plurality of cylindrical heating coil units, said cylindrical heating coil units being disposed adjacent each other in the longitudinal direction of said inductive heating device so as to surround said workpiece; a common AC power source to which said plurality of cylindrical heating coil units are connected in parallel; and heat insulating means disposed between said heating means and said workpiede; said heating means being longer than said predetermined length of said workpiece and said heating means and said workpiece being disposed in such a manner that the distance (gc) between each end portion of said workpiece and each end of said heating means in the longitudinal direction is smaller than the spacing (gw) between said heating means and said workpiece.

2. An inductive heating device as set forth in claim 1 further comprising voltage varying means connected to each of the two outermost heating coil units only for varying the voltage applied across the terminals of said outermost heating coil units.

3. An inductive heating device as set forth in claim 2 wherein said voltage varying means is comprised of a transformer.

* * * * *

REEXAMINATION CERTIFICATE (769th)
United States Patent [19]
Hoshikawa et al.

[11] B1 4,503,304
[45] Certificate Issued  Oct. 13, 1987

[54] INDUCTIVE HEATING DEVICE HAVING A PLURALITY OF HEATING COIL UNITS

[75] Inventors: Toru Hoshikawa, Kagawa; Yoshihiko Osaki, Hyogo, both of Japan

[73] Assignees: Mitsubishi Denki Kabushiki Kaisha, Tokyo; Toyo Tanso Co., Ltd., Osaka, both of Japan

Reexamination Request:
No. 90/000,869, Sep. 30, 1985

Reexamination Certificate for:
Patent No.: 4,503,304
Issued: Mar. 5, 1985
Appl. No.: 365,849
Filed: Apr. 5, 1982

[30] Foreign Application Priority Data

Apr. 7, 1981 [JP] Japan .................. 56-53365
Apr. 7, 1981 [JP] Japan .................. 56-53366

[51] Int. Cl.⁴ ............................... H05B 6/44
[52] U.S. Cl. .......................... 219/10.49 R; 219/10.43; 219/10.71; 219/10.75; 219/10.79; 373/144; 373/152; 373/155; 373/157
[58] Field of Search ............. 219/10.79, 10.69, 10.57; 373/151–153, 155; 422/241, 240, 150; 164/513

[56] References Cited
U.S. PATENT DOCUMENTS

| | | | |
|---|---|---|---|
| 1,791,934 | 2/1931 | Northrup | 219/10.57 |
| 1,864,076 | 6/1932 | Legg | 219/10.67 |
| 1,977,399 | 10/1934 | Northrup | 219/10.79 |
| 3,180,917 | 4/1965 | Morrison et al. | 219/10.67 |
| 3,485,983 | 12/1969 | Tama et al. | 219/10.57 |
| 3,497,658 | 3/1968 | Ross | 219/10.75 |

FOREIGN PATENT DOCUMENTS

| | | | |
|---|---|---|---|
| 2234127 | 1/1974 | Fed. Rep. of Germany | 219/10.49 R |
| 1349526 | 12/1963 | France | 219/10.79 |

OTHER PUBLICATIONS

"Basics of Induction Heating", Chester A. Tudbury–Vol. 1, May 1960–pp. 1–5.
"Induction Furnaces Converter Type" by Ajax Electrothermic Corporation, pp. 12–14, 1954 Bulletin 14-B.

*Primary Examiner*—A. P. Pellinen

[57] ABSTRACT

An inductive heating device for uniformly heating a workpiece at rest has a plurality of heating coil units disposed so as to surround the workpiece. The heating coil units are connected in parallel to a power source, and a transformer is used to vary the voltage across the terminals of the outermost units to increase the current flowing through these outermost units. The device, therefore, has a very short insufficient heating temperature zone attributable to an end magnetic flux effect.

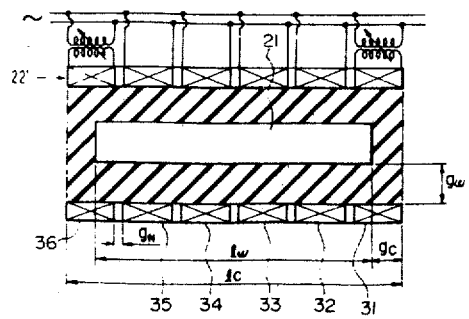

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

* * * * *